(12) United States Patent
Kim

(10) Patent No.: US 12,499,512 B2
(45) Date of Patent: Dec. 16, 2025

(54) IMPROVING COLOR DOPPLER IMAGE QUALITY USING DEEP LEARNING TECHNIQUES

(71) Applicant: GE Precision Healthcare LLC, Wauwatosa, WI (US)

(72) Inventor: Jeong Seok Kim, Seongnam-si (KR)

(73) Assignee: GE Precision Healthcare LLC, Waukesha, WI (US)

( * ) Notice: Subject to any disclaimer, the term of this patent is extended or adjusted under 35 U.S.C. 154(b) by 564 days.

(21) Appl. No.: 17/898,756

(22) Filed: Aug. 30, 2022

(65) Prior Publication Data

US 2024/0070817 A1 Feb. 29, 2024

(51) Int. Cl.
*G06T 5/50* (2006.01)
*A61B 8/00* (2006.01)
*G06T 7/00* (2017.01)

(52) U.S. Cl.
CPC ........... *G06T 5/50* (2013.01); *A61B 8/488* (2013.01); *G06T 7/0014* (2013.01); *G06T 2207/10024* (2013.01); *G06T 2207/10132* (2013.01); *G06T 2207/20081* (2013.01); *G06T 2207/20084* (2013.01); *G06T 2207/30168* (2013.01)

(58) Field of Classification Search
CPC ............ G06T 5/50; G06T 7/0014; G06T 2207/10024; G06T 2207/10132; G06T 2207/20081; G06T 2207/20084; G06T 2207/30168; G06T 5/60; G06T 2207/30101; G06T 5/73; G06T 2207/10; G06T 7/0012; A61B 8/488; A61B 8/0891; A61B 8/5223; A61B 8/0883; A61B 8/085; A61B 8/463; A61B 8/06; A61B 8/08; A61B 8/5207
USPC ........................................................ 382/128
See application file for complete search history.

(56) References Cited

U.S. PATENT DOCUMENTS

2021/0307726 A1* 10/2021 Wernick et al. ....... A61B 8/483
2021/0390696 A1* 12/2021 Iwase et al. .......... G06T 7/0012
2022/0061816 A1* 3/2022 Lee ...................... A16B 8/5207

* cited by examiner

*Primary Examiner* — Matthew C Bella
*Assistant Examiner* — Daniel Joseph Santos
(74) *Attorney, Agent, or Firm* — McAndrews, Held & Malloy, Ltd.; Daniel Bissing; David Bates

(57) ABSTRACT

Systems and methods are provided for improving color Doppler image quality using deep learning techniques. In a medical imaging system, signals associated with a medical imaging technique may be acquired and processed, with the processing including determining Doppler effects associated with at least some of the signals. Medical images configured for color Doppler based examination may be generated based on the processing of the acquired signals and the determining of the Doppler effects. The medical images may be low quality color images. The medical images may be processed using at least one reference medical image corresponding to at least one of the medical images, with the at least one reference medical image being high quality color image. The processing may include applying artificial intelligence (AI) based processing, such as deep learning based modeling. Improved medical images may then be generated based on the processing of the medical images.

21 Claims, 6 Drawing Sheets

IMPROVING COLOR DOPPLER IMAGE QUALITY USING DEEP LEARNING TECHNIQUES

FIELD

Aspects of the present disclosure relate to medical imaging solutions. More specifically, certain embodiments relate to methods and systems for improving color Doppler image quality using deep learning techniques.

BACKGROUND

Various medical imaging techniques may be used, such as in imaging organs and soft tissues in a human body. Examples of medical imaging techniques include ultrasound imaging, computed tomography (CT) scans, magnetic resonance imaging (MRI), etc. The manner by which images are generated during medical imaging depends on the particular technique.

For example, ultrasound imaging uses real time, non-invasive high frequency sound waves to produce ultrasound images, typically of organs, tissues, objects (e.g., fetus) inside the human body. Images produced or generated during medical imaging may be two-dimensional (2D), three-dimensional (3D), and/or four-dimensional (4D) images (essentially real-time/continuous 3D images). During medical imaging, imaging datasets (including, e.g., volumetric imaging datasets during 3D/4D imaging) are acquired and used in generating and rendering corresponding images (e.g., via a display) in real-time.

Existing medical imaging solutions may have some limitations. For example, use of medical imaging systems in conjunction with certain types of examinations (e.g., certain types of tissues or bodily functions) may have some limitations, particularly with respect to presenting certain types of feedback information to the user during the examinations, and conventional approaches may not sufficiently address or overcome these issues.

Further limitations and disadvantages of conventional and traditional approaches will become apparent to one of skill in the art, through comparison of such systems with some aspects of the present disclosure, as set forth in the remainder of the present application with reference to the drawings.

BRIEF SUMMARY

System and methods are provided for improving color Doppler image quality using deep learning techniques, substantially as shown in and/or described in connection with at least one of the figures, as set forth more completely in the claims.

These and other advantages, aspects and novel features of the present disclosure, as well as details of one or more illustrated example embodiments thereof, will be more fully understood from the following description and drawings.

DETAILED DESCRIPTION

Figure 1:
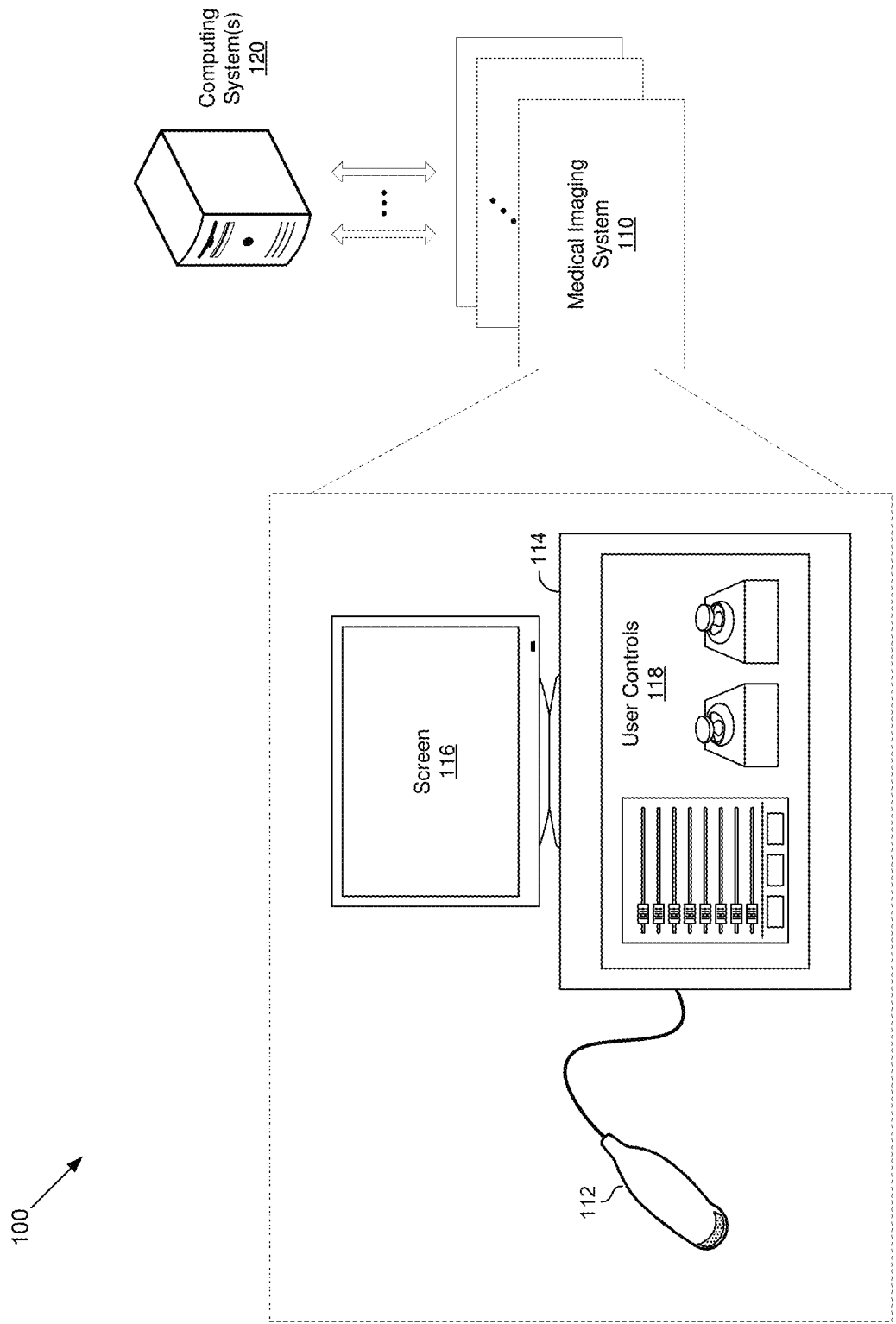
FIG. 1 is a block diagram illustrating an example medical imaging arrangement.

Certain implementations in accordance with the present disclosure may be directed to improving color Doppler image quality using deep learning techniques. The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" as used in the context of ultrasound imaging is used to refer to an ultrasound mode such as B-mode (2D mode), M-mode, three-dimensional (3D) mode, CF-mode, PW Doppler, CW Doppler, MGD, and/or sub-modes of B-mode and/or CF such as Shear Wave Elasticity Imaging (SWEI), TVI, Angio, B-flow, BMI, BMI_Angio, and in some cases also MM, CM, TVD where the "image" and/or "plane" includes a single beam or multiple beams.

In addition, as used herein, the phrase "pixel" also includes embodiments where the data is represented by a "voxel." Thus, both the terms "pixel" and "voxel" may be used interchangeably throughout this document.

Furthermore, the term processor or processing unit, as used herein, refers to any type of processing unit that can carry out the required calculations needed for the various embodiments, such as single or multi-core: CPU, Accelerated Processing Unit (APU), Graphics Board, DSP, FPGA, ASIC, or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". In addition, forming of images may be performed using channel combinations that may originate from more than one transmit event (e.g., synthetic aperture techniques).

In various embodiments, processing to form images is performed in software, firmware, hardware, or a combination thereof. The processing may include use of beamforming.

FIG. 1 is a block diagram illustrating an example medical imaging arrangement. Shown in FIG. 1 is an example medical imaging arrangement 100 that comprises one or more medical imaging systems 110 and one or more computing systems 120. The medical imaging arrangement 100 (including various elements thereof) may be configured to support medical imaging and solutions associated therewith.

The medical imaging system 110 comprise suitable hardware, software, or a combination thereof, for supporting medical imaging—that is enabling obtaining data used in generating and/or rendering images during medical imaging exams. Examples of medical imaging include ultrasound imaging, computed tomography (CT) scans, magnetic resonance imaging (MRI), etc. This may entail capturing of particular type of data, in particular manner, which may in turn be used in generating data for the images. For example, the medical imaging system 110 may be an ultrasound imaging system, configured for generating and/or rendering ultrasound images.

As shown in FIG. 1, the medical imaging system 110 may comprise a scanner device 112, which may be portable and movable, and a display/control unit 114. The scanner device 112 may be configured for generating and/or capturing particular type of imaging signals (and/or data corresponding thereto), such as by being moved over a patient's body (or part thereof), and may comprise suitable circuitry for performing and/or supporting such functions. The scanner device 112 may be an ultrasound probe, MRI scanner, CT scanner, or any suitable imaging device. For example, where the medical imaging system 110 is an ultrasound system, the scanner device 112 may emit ultrasound signals and capture echo ultrasound images.

The display/control unit 114 may be configured for displaying images (e.g., via a screen 116). In some instances, the display/control unit 114 may further be configured for generating the displayed images, at least partly. Further, the display/control unit 114 may also support user input/output. For example, the display/control unit 114 may provide (e.g., via the screen 116), in addition to the images, user feedback (e.g., information relating to the system, functions thereof, settings thereof, etc.). The display/control unit 114 may also support user input (e.g., via user controls 118), such as to allow controlling of the medical imaging. The user input may be directed to controlling display of images, selecting settings, specifying user preferences, requesting feedback, etc.

In some implementations, the medical imaging arrangement 100 may also incorporate additional and dedicated computing resources, such as the one or more computing systems 120. In this regard, each computing system 120 may comprise suitable circuitry, interfaces, logic, and/or code for processing, storing, and/or communication data. The computing system 120 may be dedicated equipment configured particularly for use in conjunction with medical imaging, or it may be a general purpose computing system (e.g., personal computer, server, etc.) set up and/or configured to perform the operations described hereinafter with respect to the computing system 120. The computing system 120 may be configured to support operations of the medical imaging systems 110, as described below. In this regard, various functions and/or operations may be offloaded from the imaging systems. This may be done to streamline and/or centralize certain aspects of the processing, to reduce cost—e.g., by obviating the need to increase processing resources in the imaging systems.

The computing systems 120 may be set up and/or arranged for use in different ways. For example, in some implementations a single computing system 120 may be used; in other implementations multiple computing systems 120, either configured to work together (e.g., based on distributed-processing configuration), or separately, with each computing system 120 being configured to handle particular aspects and/or functions, and/or to process data only for particular medical imaging systems 110. Further, in some implementations, the computing systems 120 may be local (e.g., co-located with one or more medical imaging systems 110, such within the same facility and/or same local network); in other implementations, the computing systems 120 may be remote and thus can only be accessed via remote connections (e.g., via the Internet or other available remote access techniques). In a particular implementation, the computing systems 120 may be configured in cloud-based manner, and may be accessed and/or used in substantially similar way that other cloud-based systems are accessed and used.

Once data is generated and/or configured in the computing system 120, the data may be copied and/or loaded into the medical imaging systems 110. This may be done in different ways. For example, the data may be loaded via directed connections or links between the medical imaging systems 110 and the computing system 120. In this regard, communications between the different elements in the medical imaging arrangement 100 may be done using available wired and/or wireless connections, and/or in accordance any suitable communication (and/or networking) standards or protocols. Alternatively, or additionally, the data may be loaded into the medical imaging systems 110 indirectly. For example, the data may be stored into suitable machine readable media (e.g., flash card, etc.), which are then used to load the data into the medical imaging systems 110 (on-site, such as by users of the systems (e.g., imaging clinicians) or authorized personnel), or the data may be downloaded into local communication-capable electronic devices (e.g., laptops, etc.), which are then used on-site (e.g., by users of the systems or authorized personnel) to upload the data into the medical imaging systems 110, via direct connections (e.g., USB connector, etc.).

In operation, the medical imaging system 110 may be used in generating and presenting (e.g., rendering or displaying) images during medical exams, and/or in supporting user input/output in conjunction therewith. The images may be 2D, 3D, and/or 4D images. The particular operations or functions performed in the medical imaging system 110 to facilitate the generating and/or presenting of images depends on the type of system—that is, the manner by which the data corresponding to the images is obtained and/or generated. For example, in computed tomography (CT) scans based imaging, the data is based on emitted and captured x-rays signals. In ultrasound imaging, the data is based on emitted and echo ultrasound signals. This described in more details with respect to the example ultrasound-based implementation illustrated in and described with respect to FIG. 2.

In various implementations in accordance with the present disclosure, medical imaging systems and/or architectures (e.g., the medical imaging system 110 and/or the medical imaging arrangement 100 as a whole) may be configured to support implementing and using improving color Doppler image quality using deep learning techniques during medical imaging operations (e.g., ultrasound imaging). Doppler based medical imaging (e.g., Doppler ultrasound) solutions are non-invasive medical imaging examination techniques that utilized the Doppler effect for detecting movement of tissues and/or body fluids (e.g., blood), and their velocity (e.g., relative to the medical imaging probe), with that movement and/or velocity being represented or depicted in the corresponding images. In this regard, emitted signals (e.g., ultrasound signals in Doppler ultrasound tests) may bounce off of objects in the blood (e.g., circulating red blood cells) allowing for movement of these objects to captured and measured, with the movement being shown—e.g., in a visual format that is easy to comprehend by the operator (e.g., medical imaging technician). By detecting and measuring the movement and/or velocity of patient's blood flow, healthcare professionals may assess various aspect of circulatory the condition of arteries, blood vessels, veins, and more. One commonly used type of Doppler based medical imaging is color flow Doppler (also referred to as "color Doppler based imaging", or simply "color Doppler"), in which detected Doppler pulses are converted into colors, which may be overlaid onto the images, such as images of blood vessel(s). Displaying the resultant color encoded images creates a visual of the speed and direction of blood flow through the vessel.

Conventional color Doppler based solutions may have some limitations, however. As such, enhancing color Doppler based medical imaging is desirable. This may be done by optimizing various aspects or elements of the color Doppler based medical imaging. For example, optimizing the processing required for color Doppler based medical imaging may greatly improve performance. In this regard, in color Doppler flow diagnostic images, the relationship between image quality and frame rate resulting from ensemble size is an inverse factor.

Accordingly, in various embodiments in accordance with the present disclosure, color Doppler flow diagnostic medical imaging may be improved by use of advanced processing techniques, particularly by use of artificial intelligence (AI) based processing. For example, medical imaging solutions may incorporate components or tools (e.g., comprising suitable circuitry) for handling certain tasks or functions during medical imaging operations, such as processing signals captured during the examination, performing particular measurements based on and relating to obtained signals and/or corresponding medical images, etc. Such components or tools may be configured to incorporate advanced processing techniques, such as artificial intelligence (AI) based processing, in performing at least some of tasks or functions associated therewith.

For example, in various implementations, through use of deep learning techniques, the image quality and frame rate may be maintained. In other words, implementations in accordance with the present disclosure may allow for color image quality and frame rate to be maintained at the same time, which in turn may help in and further enhance user diagnosis. Example embodiments and/or features related thereto are described in more detail below.

Figure 2:
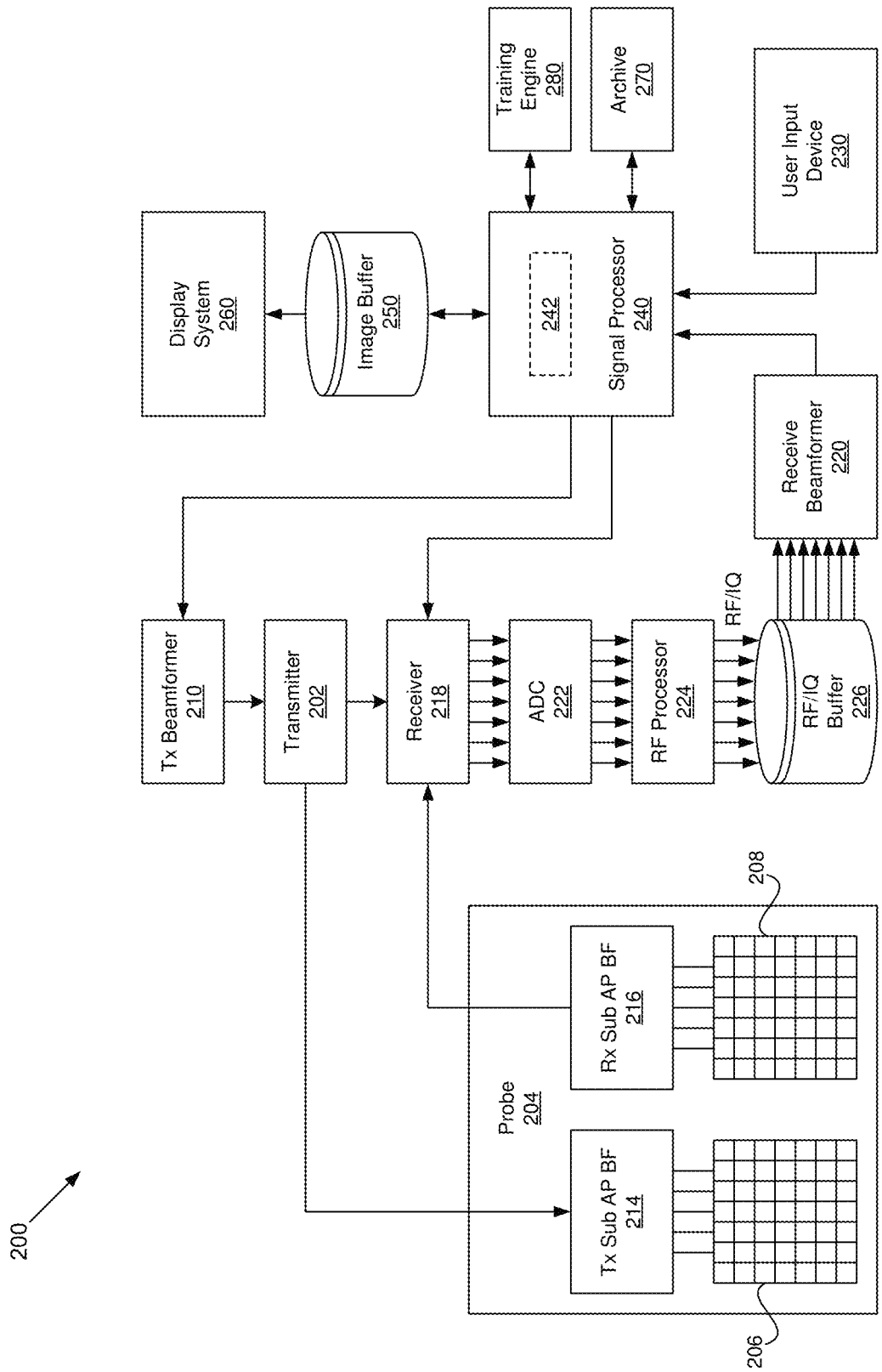
FIG. 2 is a block diagram illustrating an example ultrasound system.

FIG. 2 is a block diagram illustrating an example ultrasound imaging system. Shown in FIG. 2 is an ultrasound imaging system 200, which may be configured to support use of improving color Doppler image quality using deep learning techniques in accordance with the present disclosure.

The ultrasound imaging system 200 may be configured for providing ultrasound imaging, and as such may comprise suitable circuitry, interfaces, logic, and/or code for performing and/or supporting ultrasound imaging related functions. The ultrasound imaging system 200 may correspond to the medical imaging system 110 of FIG. 1. The ultrasound imaging system 200 comprises, for example, a transmitter 202, an ultrasound probe 204, a transmit beamformer 210, a receiver 218, a receive beamformer 220, a RF processor 224, a RF/IQ buffer 226, a user input module 230, a signal processor 240, an image buffer 250, a display system 260, an archive 270, and a training engine 280.

The transmitter 202 may comprise suitable circuitry, interfaces, logic, and/or code that may be operable to drive an ultrasound probe 204. The ultrasound probe 204 may comprise a two dimensional (2D) array of piezoelectric elements. The ultrasound probe 204 may comprise a group of transmit transducer elements 206 and a group of receive transducer elements 208, that normally constitute the same elements. In certain embodiment, the ultrasound probe 204 may be operable to acquire ultrasound image data covering at least a substantial portion of an anatomy, such as the heart, a blood vessel, or any suitable anatomical structure.

The transmit beamformer 210 may comprise suitable circuitry, interfaces, logic, and/or code that may be operable to control the transmitter 202 which, through a transmit sub-aperture beamformer 214, drives the group of transmit transducer elements 206 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 208.

The group of receive transducer elements 208 in the ultrasound probe 204 may be operable to convert the received echoes into analog signals, undergo sub-aperture beamforming by a receive sub-aperture beamformer 216 and are then communicated to a receiver 218. The receiver 218 may comprise suitable circuitry, interfaces, logic, and/or code that may be operable to receive the signals from the receive sub-aperture beamformer 216. The analog signals may be communicated to one or more of the plurality of A/D converters 222.

The plurality of A/D converters 222 may comprise suitable circuitry, interfaces, logic, and/or code that may be operable to convert the analog signals from the receiver 218 to corresponding digital signals. The plurality of A/D converters 222 are disposed between the receiver 218 and the RF processor 224. Notwithstanding, the disclosure is not limited in this regard. Accordingly, in some embodiments, the plurality of A/D converters 222 may be integrated within the receiver 218.

The RF processor 224 may comprise suitable circuitry, interfaces, logic, and/or code that may be operable to demodulate the digital signals output by the plurality of A/D converters 222. In accordance with an embodiment, the RF processor 224 may comprise a complex demodulator (not shown) that is operable to demodulate the digital signals to form I/Q data pairs that are representative of the corresponding echo signals. The RF or I/Q signal data may then be communicated to an RF/IQ buffer 226. The RF/IQ buffer 226 may comprise suitable circuitry, interfaces, logic, and/or code that may be operable to provide temporary storage of the RF or I/Q signal data, which is generated by the RF processor 224.

The receive beamformer 220 may comprise suitable circuitry, interfaces, logic, and/or code that may be operable to perform digital beamforming processing to, for example, sum the delayed channel signals received from RF processor 224 via the RF/IQ buffer 226 and output a beam summed signal. The resulting processed information may be the beam summed signal that is output from the receive beamformer 220 and communicated to the signal processor 240. In accordance with some embodiments, the receiver 218, the plurality of A/D converters 222, the RF processor 224, and the beamformer 220 may be integrated into a single beamformer, which may be digital. In various embodiments, the ultrasound imaging system 200 comprises a plurality of receive beamformers 220.

The user input device 230 may be utilized to input patient data, scan parameters, settings, select protocols and/or templates, interact with an artificial intelligence segmentation processor to select tracking targets, and the like. In an example embodiment, the user input device 230 may be operable to configure, manage and/or control operation of one or more components and/or modules in the ultrasound imaging system 200. In this regard, the user input device 230 may be operable to configure, manage and/or control operation of the transmitter 202, the ultrasound probe 204, the transmit beamformer 210, the receiver 218, the receive beamformer 220, the RF processor 224, the RF/IQ buffer 226, the user input device 230, the signal processor 240, the image buffer 250, the display system 260, archive 270, and/or the training engine 280.

For example, the user input device 230 may include button(s), rotary encoder(s), a touchscreen, motion tracking, voice recognition, a mouse device, keyboard, camera and/or any other device capable of receiving user directive(s). In certain embodiments, one or more of the user input devices 230 may be integrated into other components, such as the display system 260 or the ultrasound probe 204, for example.

As an example, user input device 230 may include a touchscreen display. As another example, user input device 230 may include an accelerometer, gyroscope, and/or magnetometer attached to and/or integrated with the probe 204 to provide gesture motion recognition of the probe 204, such as to identify one or more probe compressions against a patient body, a pre-defined probe movement or tilt operation, or the like. In some instances, the user input device 230 may include, additionally or alternatively, image analysis processing to identify probe gestures by analyzing acquired image data. In accordance with the present disclosure, the user input and functions related thereto may be configured to support use of new data storage scheme, as described in this disclosure. For example, the user input device 230 may be configured to support receiving user input directed at triggering and managing (where needed) application of separation process, as described herein, and/or to provide or set parameters used in performing such process. Similarly, the user input device 230 may be configured to support receiving user input directed at triggering and managing (where needed) application of the recovery process, as described herein, and/or to provide or set parameters used in performing such process.

The signal processor 240 may comprise suitable circuitry, interfaces, logic, and/or code that may be operable to process ultrasound scan data (i.e., summed IQ signal) for generating ultrasound images for presentation on a display system 260. The signal processor 240 is operable to perform one or more processing operations according to a plurality of selectable ultrasound modalities on the acquired ultrasound scan data. In an example embodiment, the signal processor 240 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 226 during a scanning session and processed in less than real-time in a live or off-line operation. In various embodiments, the processed image data can be presented at the display system 260 and/or may be stored at the archive 270.

The archive 270 may be a local archive, a Picture Archiving and Communication System (PACS), or any suitable device for storing images and related information, or may be coupled to such device or system for facilitating the storage and/or achieving of the imaging related data. In an example implementation, the archive 270 is further coupled to a remote system such as a radiology department information system, hospital information system, and/or to an internal or external network (not shown) to allow operators at different locations to supply commands and parameters and/or gain access to the image data.

The signal processor 240 may be one or more central processing units, microprocessors, microcontrollers, and/or the like. The signal processor 240 may be an integrated component, or may be distributed across various locations, for example. The signal processor 240 may be configured for receiving input information from the user input device 230 and/or the archive 270, generating an output displayable by the display system 260, and manipulating the output in response to input information from the user input device 230, among other things. The signal processor 240 may be capable of executing any of the method(s) and/or set(s) of instructions discussed herein in accordance with the various embodiments, for example.

The ultrasound imaging system 200 may be operable to continuously acquire ultrasound scan data at a frame rate that is suitable for the imaging situation in question. Typical frame rates range from 20-220 but may be lower or higher. The acquired ultrasound scan data may be displayed on the display system 260 at a display-rate that can be the same as the frame rate, or slower or faster. The image buffer 250 is included for storing processed frames of acquired ultrasound scan data that are not scheduled to be displayed immediately. Preferably, the image buffer 250 is of sufficient capacity to store at least several minutes' worth of frames of ultrasound scan data. The frames of ultrasound scan data are stored in a manner to facilitate retrieval thereof according to its order or time of acquisition. The image buffer 250 may be embodied as any known data storage medium.

In an example embodiment, the signal processor 240 may comprise a color Doppler improvement module 242, which comprises suitable circuitry, interfaces, logic, and/or code that may be configured to perform and/or support various functions or operations relating to, or in support of use of improving color Doppler image quality using deep learning techniques, as described in this disclosure.

In some implementations, the signal processor 240 (and/or components thereof, such as the color Doppler improvement module 242) may be configured to implement and/or use artificial intelligence and/or machine learning techniques to enhance and/or optimize imaging related functions or operations. For example, the signal processor 240 (and/or components thereof, such as the color Doppler improvement module 242) may be configured to implement and/or use deep learning techniques and/or algorithms, such as by use of deep neural networks (e.g., one or more of convolutional neural network (CNN), a generative adversarial network (GAN), etc.), and/or may utilize any suitable form of artificial intelligence based processing techniques or machine learning processing functionality (e.g., for image analysis). Such artificial intelligence based image analysis may be configured to, e.g., analyze acquired ultrasound images, such as to identify, segment, label, and track structures (or tissues thereof) meeting particular criteria and/or having particular characteristics.

In an example implementation, the signal processor 240 (and/or components thereof, such as the color Doppler improvement module 242) may be provided as deep neural network(s). An example deep neural network may be made up of, e.g., an input layer, an output layer, and one or more hidden layers in between the input and output layers. Each of the layers may be made up of a plurality of processing nodes that may be referred to as neurons.

For example, the deep neural network may include an input layer having a neuron for each pixel or a group of pixels from a scan plane of an anatomical structure, and the output layer may have a neuron corresponding to a plurality of pre-defined structures or types of structures (or tissue(s) therein). Each neuron of each layer may perform a processing function and pass the processed ultrasound image information to one of a plurality of neurons of a downstream layer for further processing. As an example, neurons of a first layer may learn to recognize edges of structure in the ultrasound image data. The neurons of a second layer may learn to recognize shapes based on the detected edges from the first layer. The neurons of a third layer may learn positions of the recognized shapes relative to landmarks in the ultrasound image data. The neurons of a fourth layer may learn characteristics of particular tissue types present in particular structures, etc. Thus, the processing performed by the deep neural network(s) may allow for identifying biological and/or artificial structures in ultrasound image data with a high degree of probability.

In some implementations, the signal processor 240 (and/or components thereof, such as the color Doppler improvement module 242) may be configured to perform or otherwise control at least some of the functions performed thereby based on a user instruction via the user input device 230. As an example, a user may provide a voice command, probe gesture, button depression, or the like to issue a particular instruction, such as to initiate and/or control various aspects of the color Doppler improvement function(s), and/or to provide or otherwise specify various parameters or settings relating thereto, as described in this disclosure.

The training engine 280 may comprise suitable circuitry, interfaces, logic, and/or code that may be operable to train the neurons of the deep neural network(s) of the signal processor 240 (and/or components thereof, such as the color Doppler improvement module 242). For example, the signal processor 240 may be trained to identify particular structures and/or tissues (or types thereof) provided in an ultrasound scan plane, with the training engine 280 training the deep neural network(s) thereof to perform some of the required functions, such as using databases(s) of classified ultrasound images of various structures.

As an example, the training engine 280 may be configured to utilize ultrasound images to train the signal processor 240 (and/or components thereof, such as the color Doppler improvement module 242), such as based on particular structure(s) and/or characteristics thereof, particular tissues and/or characteristics thereof, etc. For example, with the respect to structure(s), the training engine 280 may be configured to identify and utilize such characteristics as appearance of structure edges, appearance of structure shapes based on the edges, positions of the shapes relative to landmarks in the ultrasound image data, and the like. In various embodiments, the databases of training images may be stored in the archive 270 or any suitable data storage medium. In certain embodiments, the training engine 280 and/or training image databases may be external system(s) communicatively coupled via a wired or wireless connection to the ultrasound imaging system 200.

In operation, the ultrasound imaging system 200 may be used in generating ultrasonic images, including two-dimensional (2D), three-dimensional (3D), and/or four-dimensional (4D) images. In this regard, the ultrasound imaging system 200 may be operable to continuously acquire ultrasound scan data at a particular frame rate, which may be suitable for the imaging situation in question. For example, frame rates may range from 30-70 but may be lower or higher. The acquired ultrasound scan data may be displayed on the display system 260 at a display-rate that can be the same as the frame rate, or slower or faster. An image buffer 250 is included for storing processed frames of acquired ultrasound scan data not scheduled to be displayed immediately. Preferably, the image buffer 250 is of sufficient capacity to store at least several seconds' worth of frames of ultrasound scan data. The frames of ultrasound scan data are stored in a manner to facilitate retrieval thereof according to its order or time of acquisition. The image buffer 250 may be embodied as any known data storage medium.

In some instances, the ultrasound imaging system 200 may be configured to support grayscale and color based operations. For example, the signal processor 240 may be operable to perform grayscale B-mode processing and/or color processing. The grayscale B-mode processing may comprise processing B-mode RF signal data or IQ data pairs. For example, the grayscale B-mode processing may enable forming an envelope of the beam-summed receive signal by computing the quantity $(I^2+Q^2)^{1/2}$. The envelope can undergo additional B-mode processing, such as logarithmic compression to form the display data.

The display data may be converted to X-Y format for video display. The scan-converted frames can be mapped to grayscale for display. The B-mode frames that are provided to the image buffer 250 and/or the display system 260. The color processing may comprise processing color based RF signal data or IQ data pairs to form frames to overlay on B-mode frames that are provided to the image buffer 250 and/or the display system 260. The grayscale and/or color processing may be adaptively adjusted based on user input—e.g., a selection from the user input device 230, for example, for enhance of grayscale and/or color of particular area.

In some instances, ultrasound imaging may include generation and/or display of volumetric ultrasound images—that is where objects (e.g., organs, tissues, etc.) are displayed three-dimensional 3D. In this regard, with 3D (and similarly 4D) imaging, volumetric ultrasound datasets may be acquired, comprising voxels that correspond to the imaged objects. This may be done, e.g., by transmitting the sound waves at different angles rather than simply transmitting them in one direction (e.g., straight down), and then capture their reflections back. The returning echoes (of transmissions at different angles) are then captured, and processed (e.g., via the signal processor 240) to generate the corresponding volumetric datasets, which may in turn be used in creating and/or displaying volume (e.g. 3D) images, such as via the display 250. This may entail use of particular handling techniques to provide the desired 3D perception.

For example, volume rendering techniques may be used in displaying projections (e.g., 3D projections) of the volumetric (e.g., 3D) datasets. In this regard, rendering a 3D projection of a 3D dataset may comprise setting or defining a perception angle in space relative to the object being displayed, and then defining or computing necessary information (e.g., opacity and color) for every voxel in the dataset. This may be done, for example, using suitable transfer functions for defining RGBA (red, green, blue, and alpha) value for every voxel.

In some embodiments, the ultrasound imaging system 200 may be configured to support solutions in accordance with the present disclosure, particularly by incorporating components and/or functions, and/or configuring already existing components and/or functions, for facilitating and supporting improving color Doppler image quality, such as by use of deep learning techniques. As noted, color Doppler is a type of Doppler based medical imaging that is commonly used, particularly in conjunction with examination of (and measurement related to) bodily fluids such as blood. The ultrasound imaging system 200 may be configured to operate in color Doppler mode, for example. When operating in color Doppler, the ultrasound imaging system 200 may be configured to utilize the Doppler effect in the course of processing echo ultrasound signals. In this regard, the ultrasound imaging system 200 may be configured to, when operating in the color Doppler mode, to assess (e.g., via the processor 240) to the Doppler effect associated with captured ultrasound echo signals, and to determine or generate (e.g., via the processor 240), based on the assessing, Doppler related information that may be converted into colors that may be overlaid onto the corresponding displayed images.

As noted, enhancing performance in color Doppler based examination is very desirable. In this regard, in color Doppler flow diagnostic images, the relationship between image quality and frame rate resulting from ensemble size is an inverse factor. The use of advanced processing techniques, such as artificial intelligence based solutions like deep learning may allow for enhancing the color Doppler based examinations as image quality and frame rate may be maintained. In this regard, to measure the blood flow velocity in the color Doppler based image(s), the phase change of the input signal and the next input signal may be obtained by, e.g., calculating the lag-one autocorrelation. These signals may be proceed through the average value of the ensemble size, and if the ensemble size is large, the image quality improves, but the low frame rate sacrifice cannot be avoided. Use of advanced processing techniques, such artificial intelligence (AI) based technique (e.g., deep learning based processing) may allow for improving quality of color Doppler based images without sacrificing or otherwise degrading other performance related parameters.

In an example use case scenario, at the beginning or middle section of the color Doppler based operation (e.g., when the system is operating in color Doppler mode), the largest size of the ensemble that the scanner system may provide is performed, set as the ground truth, and the immediately following color Doppler images are performed while setting the ensemble to the smallest size to obtain a high frame rate. Through deep learning, it is processed with both higher image quality and higher frame without any sacrifice as frame rate or image quality. For example, the processor 240 may be configured, particularly via the color Doppler improvement module 242 component, implement deep learning based techniques that are tailored for improving quality of color Doppler based images. For example, this may be done by use of deep learning based modeling (e.g., using generative adversarial network (GAN) model) to process low quality images to enhance the quality thereof, without affecting or otherwise degrading other performance parameters or characteristics. The overall process for making the image area with higher quality as well as higher frame rate in the model network is depicted in more detail in FIG. 3.

Figure 3:
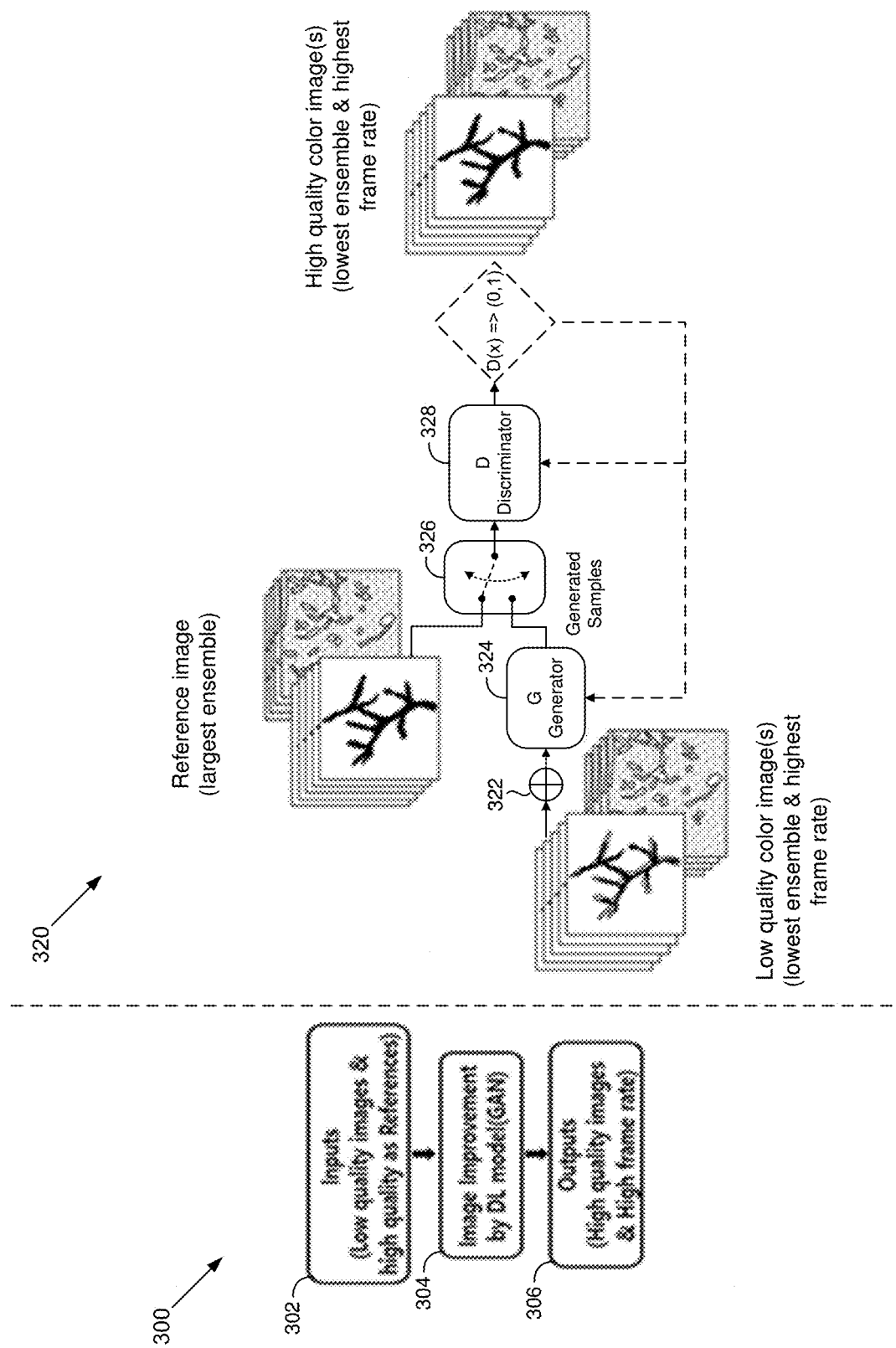
FIG. 3 illustrates a flowchart of an example process and a conceptional flow-diagram of a corresponding model network, for improving color Doppler image quality using deep learning.

FIG. 3 illustrates a flowchart of an example process and a conceptional flow-diagram of a corresponding model network, for improving color Doppler image quality using deep learning. Shown in FIG. 3 is flow chart 300 and a network 320.

As illustrated in FIG. 3, the flow chart 300 comprises a plurality of steps of processing for improving color Doppler image quality using deep learning. In particular, in step 302 inputs are provided into the process, comprising low quality images along with a high quality image (or more) for use as reference. In step 304, image improvement may be performed, using deep learning. For example, deep learning may be done using a generative adversarial network (GAN) model as described in more detail below. In this regard, color Doppler flow images may need to maintain a frame rate above a certain level required for diagnosis, which may result in low-quality color Doppler images, caused by the inevitable low ensemble size. This may be addressed, however, by use of deep learning techniques, such as generative adversarial networks (GANs). Nonetheless, the disclosure is not limited to use of generative adversarial networks (GANs). Thus, in example implementation illustrated in FIG. 3, the low quality image(s) may be fed to a GAN based network, along with the high-quality color Doppler image, obtained with the largest ensemble size, which does not consider the frame rate is regarded as a reference. The GAN network may be then trained, using the reference high-quality color Doppler image, with the goal of outputting high quality color Doppler images. In step 306 the process outputs the high quality images (with high frame rate).

The process may be implemented via a network model, such as the model network 320. In this regard, the model network 320 may be based on, and may implement an example GAN model. The model network 320 may be implemented via suitable circuitry in the system incorporating the improved color Doppler image quality related features. For example, in the ultrasound imaging system 200 of FIG. 2, the model network 320 may be incorporated via the processor 240, and particularly via the color Doppler improvement module 242 component therein.

The general idea behind the GAN model is that it allows one to train a generative model G with the goal of fooling a differentiable discriminator D that is trained to distinguish improved images from reference images. With this approach the generator may learn to create solution that are highly similar to reference images and thus difficult to classify by D.

The GAN model may incorporate and/or use a loss function. As shown in the example model network 320 illustrated in FIG. 3, the GAN model comprises a Generator (G) 324 and a Discriminator (D) 328. The Discriminator (D) 328 may be fed selectively, such as through a selector 328, output of the Generator (G) 324 and one or more reference high quality images (with highest ensemble). The Generator (G) 324 may be fed a plurality of low quality color images (with lowest ensemble and highest frame rate), which may be first combined via a combiner 322. The objective of the Generator (G) 324 is to learn a distribution $p_\theta(x)$, to approximate to the real data distribution $p_p(x)$, and to generate a plurality of samples $P_G(x)$ that equals the probability density function of the real data samples $p_r(x)$. This may be approached by directly learning the differential function $p_\theta(x)$ such that $p_\theta(x)>0$ and $\int_x p_\theta(x)dx=1$, and optimizing through maximum likelihood, or learning the differential transformation function $q_\theta(z)$ of $p_\theta(x)$ and optimizing through maximum likelihood when z is the existing common distribution such as uniform or Gaussian distribution.

The Discriminator (D) 328 may recognize the data from the real data distribution $p_r(x)$, where D indicates the estimated probability of data points $x_i \in R^n$. In this regard, in case of binary classification, if the estimated probability $D(x_i): \to R^n[0,1]$ is the positive class $p_i$ and $1-D(x_i): \to R[0,1]$ is the negative class $q_i$, the cross entropy distribution between $p_i$ and $q_i$ is, $L(p, q)=-\Sigma_i^n p_i \log q_i$. For a given point $x_i$ and corresponding label $y_i$, the data distribution $x_i$ may be from the real data $x_i \sim p_r(x)$ or the generator data $x_i \sim p_g(z)$. Considering exactly half of data from the two sources such as real, fake, the generator and discriminator tends to fight each other in min/max game to minimize the loss function. The loss function may be expressed as follows:

$$\min_G \max_D L((x_i, y_i)_{i=1}^n, D) =$$
$$-\frac{1}{2}E_{x \sim p_r(x)}\log D(x) - \frac{1}{2}E_{z \sim p_r(z)}\log[1-D(G(z))] + \lambda\Psi$$
$$\min_G \max_D L(G, D) = -\frac{1}{2}E_{x \sim p_r(x)}\log D(x) - \frac{1}{2}E_{z \sim p_r(z)}\log[1-D(G(z))] + \lambda\Psi$$
$$\lambda\Psi = E_{x \sim p_r(x)}\left[(\|\nabla_x\|^2 - 1)^2\right]$$

where the $\lambda\psi$ term is to overcome the gradient vanish effect.

Figure 4:
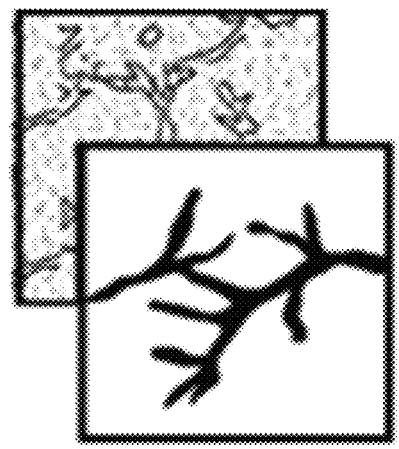
FIG. 4 illustrates an example case use scenario when utilizing improved color Doppler image quality using deep learning.
Figure 4:
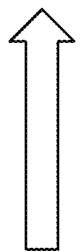
Figure 4:
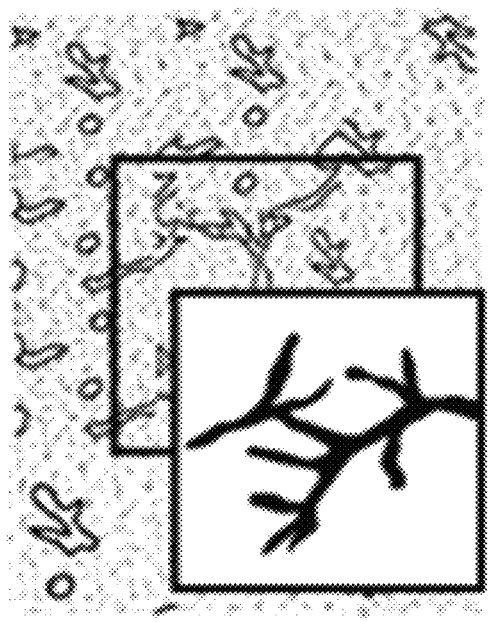

FIG. 4 illustrates an example case use scenario when utilizing improved color Doppler image quality using deep learning. Shown in FIG. 4 are color Doppler mode images (color Doppler Image and a full B image) 410 and an overlaid color Doppler Image (in the window box) 420. As an input to the upper deep learning model, in the color Doppler mode, the image of the window box area corresponding to the color Doppler image, that is, the background of the B image, is input as an image that displays the color Doppler result signal overlaid in FIG. 4.

Figure 5:
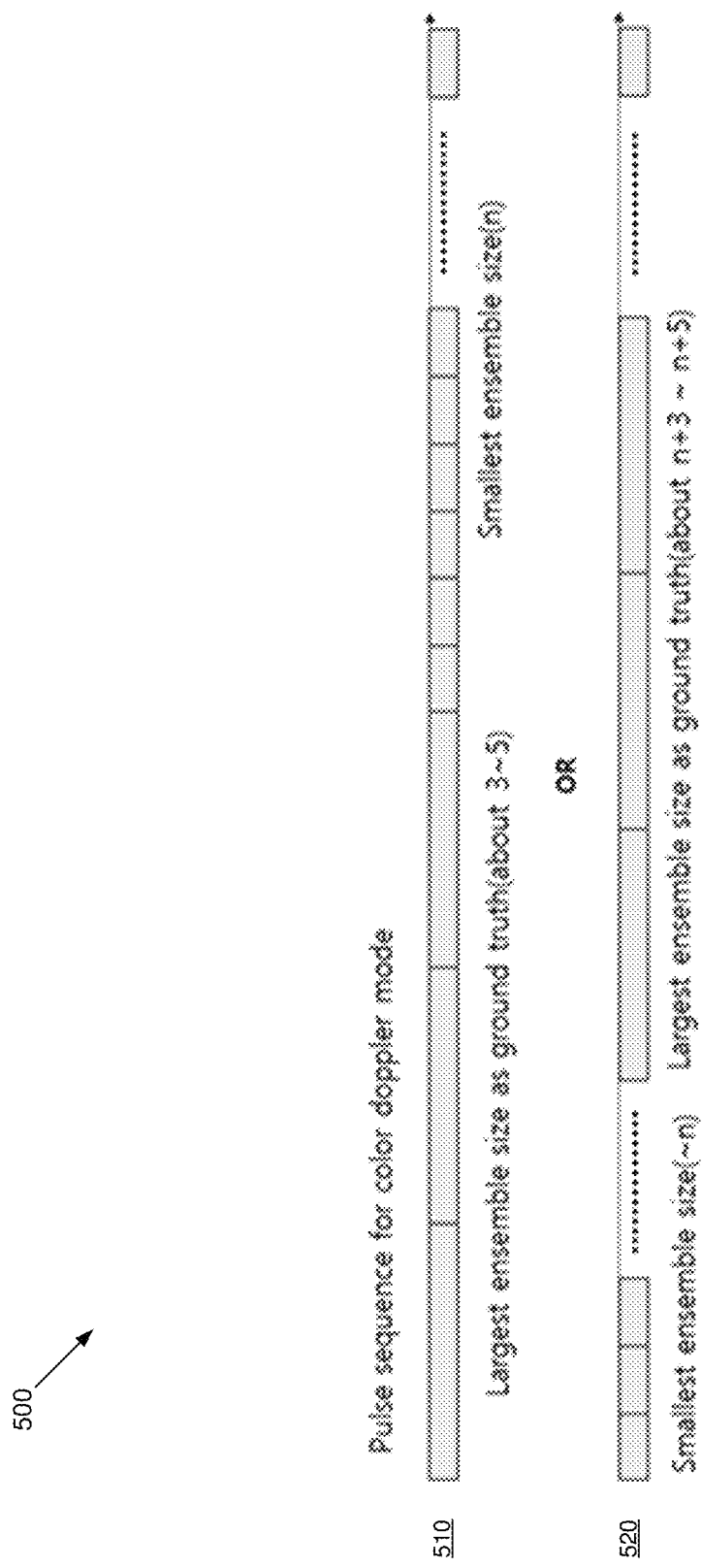
FIG. 5 is a block diagram illustrating an example pulse sequence during color Doppler mode when utilizing improved color Doppler image quality using deep learning.

FIG. 5 is a block diagram illustrating an example pulse sequence during color Doppler mode when utilizing improved color Doppler image quality using deep learning. Shown in FIG. 5 are pulse sequences 510 and 520. In this regard, the pulse sequences 510 and 520 may be used in conjunction with the process as described with respect to FIG. 3. In particular, the pulse sequence configuration illustrated in FIG. 5 may be configured with the largest ensemble size at the start of the color Doppler mode (pulse sequence 510) or intermittent in the middle of the color Doppler mode (pulse sequence 520). The largest ensemble size is configured to correspond to about 3 to 5, and the average value is set as the ground truth, and after that, in the corresponding operation mode. Each of the pulse sequences 510 and 520 is further designed to enable high-speed frame rate by configuring the smallest ensemble size.

Figure 6:
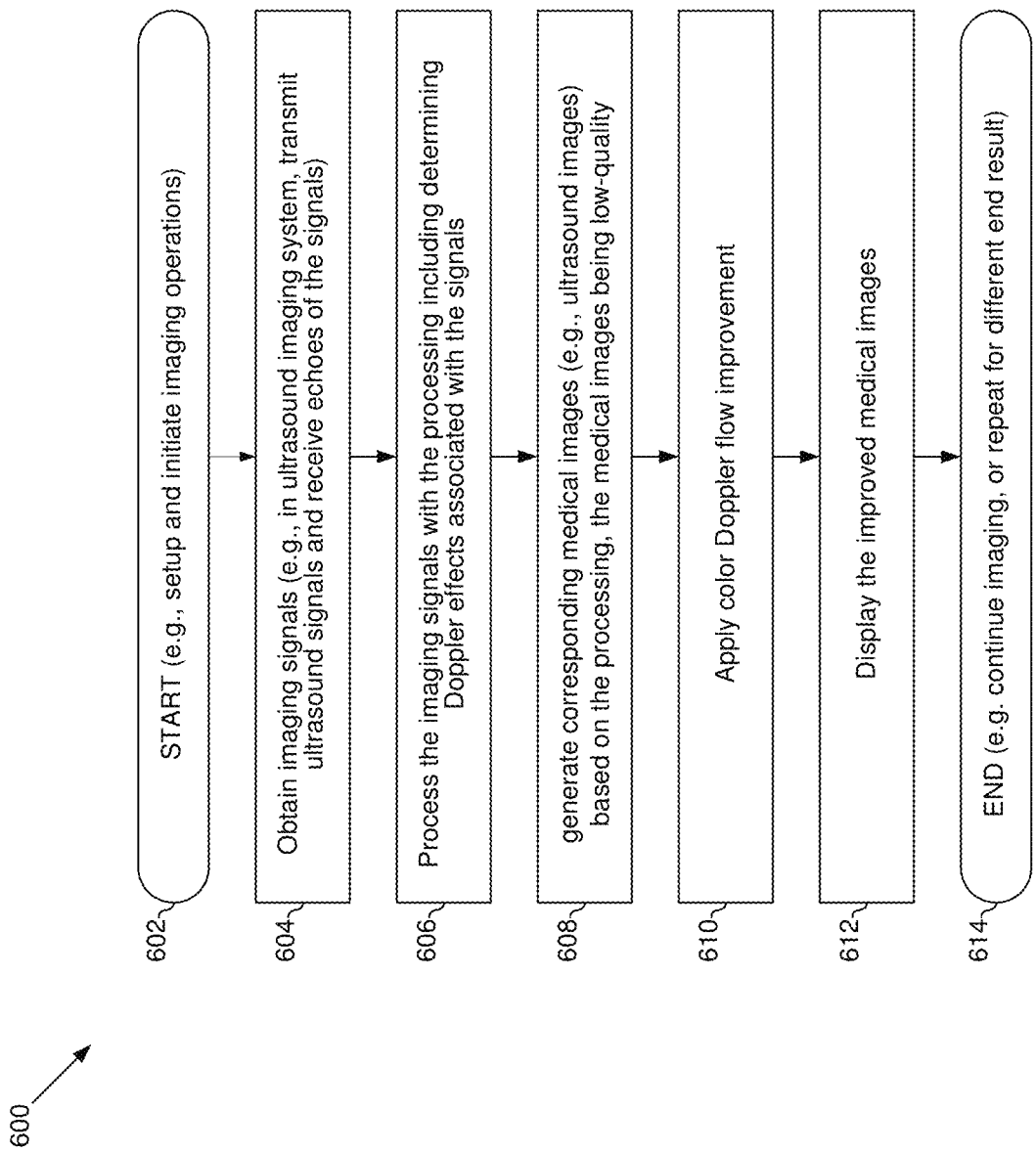
FIG. 6 illustrates a flowchart of an example process for medical imaging with improved color Doppler image quality using deep learning techniques.

FIG. 6 illustrates a flowchart of an example process for medical imaging with improved color Doppler image quality using deep learning techniques. Shown in FIG. 6 is flow chart 600, comprising a plurality of example steps (represented as blocks 602-612), which may be performed in a suitable system (e.g., the medical imaging system 110 of FIG. 1, the ultrasound imaging system 200 of FIG. 2, etc.) for improving color Doppler image quality using deep learning techniques during medical imaging operations.

In start step 602, the system may be setup, and operations may initiate.

In step 604, imaging signals may be obtained. For example, in ultrasound imaging system, this may comprise transmitting ultrasound signals and receiving/capturing echoes of the signals).

In step 606, the imaging signals may be processed, to generate and display corresponding medical images (e.g., ultrasound images). The processing may comprise determining and/or assessing Doppler effects associated with the signals.

In step 608, medical images (e.g., ultrasound images) may be generated based on the processing of the imaging signals. The medical images may be low-quality images. The generation may comprise generating at least one high quality image for use as reference during color Doppler image quality improvement functions.

In step 610, color Doppler flow image quality improvement may be applied. In this regard, as describe herein, improving color Doppler flow image quality may be comprise use of deep learning techniques, as described above—e.g., with respect to FIGS. 2-5. Applying the color Doppler flow image quality improvement results in improved medical images.

In step 612, the improved medical images are displayed. The process may then terminate in end step 614. In this regard, the terminating of the process may comprise continuing imaging operations, repeating the processing for improved medical images (e.g., steps 604-612), or simply terminating all imaging operations.

An example method, in accordance with the present disclosure, comprises: acquiring signals based on a medical imaging technique during medical imaging based examination of a patient; processing the acquired signals, wherein the processing comprises determining Doppler effects associated with at least some of the signals; generating based on the processing of the acquired signals and the determining of the Doppler effects, one or more medical images, wherein the medical images are configured for color Doppler based examination, and wherein the one or more medical images comprise low quality color images; processing the one or more medical images using at least one reference medical image corresponding to at least one of the one or more medical images, wherein the at least one reference medical image comprises high quality color image; and generating based on the processing of the one or more medical images, one or more improved medical images. The medical imaging technique may comprise ultrasound based medical imaging.

In example embodiment, the method further comprises processing the one or more medical images comprises applying artificial intelligence (AI) based processing.

In example embodiment, applying the artificial intelligence (AI) based processing comprises applying deep learning based processing.

In example embodiment, applying the deep learning based processing comprises applying a deep learning based modeling.

In example embodiment, applying the deep learning based modeling comprises use of a generative adversarial network (GAN) based model.

In example embodiment, applying the deep learning based modeling comprises determining a distribution $p_\theta(x)$ that is an approximate to a real distribution P r (x) associated with the one or more medical images.

In example embodiment, applying a deep learning based modeling comprises generating a plurality of samples $p_G(x)$ that equals a probability density function of the real samples $p_r(x)$ associated with the one or more medical images.

An example non-transitory computer readable medium, in accordance with the present disclosure, has stored thereon a computer program having at least one code section, the at least one code section being executable by a machine comprising at least one processing circuit, for causing the machine to perform one or more steps comprising: acquiring signals based on a medical imaging technique during medical imaging based examination of a patient; processing the acquired signals, wherein the processing comprises determining Doppler effects associated with at least some of the signals; generating based on the processing of the acquired signals and the determining of the Doppler effects, one or more medical images, wherein the medical images are configured for color Doppler based examination, and wherein the one or more medical images comprise low quality color images; processing the one or more medical images using at least one reference medical image corresponding to at least one of the one or more medical images, wherein the at least one reference medical image comprises high quality color image; and generating based on the processing of the one or more medical images, one or more improved medical images. The medical imaging technique may comprise ultrasound based medical imaging.

In example embodiment, the one or more steps further comprise processing the one or more medical images comprises applying artificial intelligence (AI) based processing.

In example embodiment, applying the artificial intelligence (AI) based processing comprises applying deep learning based processing.

In example embodiment, applying the deep learning based processing comprises applying a deep learning based modeling.

In example embodiment, applying a deep learning based modeling comprises use of a generative adversarial network (GAN) based model.

In example embodiment, applying the deep learning based modeling comprises determining a distribution $p_\theta(x)$ that is an approximate to a real distribution $p_r(x)$ associated with the one or more medical images.

In example embodiment, the applying the deep learning based modeling comprises generating a plurality of samples $p_G(x)$ that equal a probability density function of the real samples $p_r(x)$ associated with the one or more medical images.

An example system, in accordance with the present disclosure, comprises: a scanner configured to acquire imaging signals based on a medical imaging technique during medical imaging based examination of a patient; and one or more circuits configured to: process the acquired signals, wherein the processing comprises determining Doppler effects associated with at least some of the signals; generate based on the processing of the acquired signals and the determining of the Doppler effects, one or more medical images, wherein the medical images are configured for color Doppler based examination, and wherein the one or more medical images comprise low quality color images; process the one or more medical images using at least one reference medical image corresponding to at least one of the one or more medical images, wherein the at least one reference medical image comprises high quality color image; and generate based on the processing of the one or more medical images, one or more improved medical images. The medical imaging technique may comprise ultrasound based medical imaging.

In example embodiment, the one or more circuits are further configured to, when processing the one or more medical images, apply artificial intelligence (AI) based processing.

In example embodiment, the one or more circuits are further configured to, when applying the artificial intelligence (AI) based processing, apply deep learning based processing.

In example embodiment, the one or more circuits are further configured to, when applying the deep learning based processing, apply a deep learning based modeling.

In example embodiment, the one or more circuits are further configured to apply the deep learning based modeling using a generative adversarial network (GAN) based model.

In example embodiment, the one or more circuits are further configured to, when applying the deep learning based processing, determine a distribution $p_\theta(x)$ that is an approximate to a real distribution $p_r(x)$ associated with the one or more medical images.

In example embodiment, the one or more circuits are further configured to, when applying the deep learning based processing, generate a plurality of samples $p_G(x)$ that equals a probability density function of the real samples $p_r(x)$ associated with the one or more medical images.

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," set off lists of one or more non-limiting examples, instances, or illustrations. As utilized herein, circuitry is "operable" to perform a function whenever the circuitry comprises the necessary hardware (and code, if any is necessary) to perform the function, regardless of whether performance of the function is disabled or not enabled (e.g., by some user-configurable setting, a factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present disclosure may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
acquiring signals based on a medical imaging technique during medical imaging based examination of a patient, wherein the signals are acquired based on a first ensemble size and a first frame rate;
processing the acquired signals, wherein the processing comprises determining Doppler effects associated with at least some of the signals;
generating based on the processing of the acquired signals and the determining of the Doppler effects, one or more medical images, wherein the medical images are configured for color Doppler based examination, and wherein the one or more medical images comprise low quality color images;
processing the one or more medical images using at least one reference medical image corresponding to at least one of the one or more medical images, wherein the at least one reference medical image comprises high quality color image, wherein the high quality color image is generated based on signals acquired based on a second ensemble size and a second frame rate, and wherein the second ensemble size is higher than the first ensemble size and the second frame rate is lower than the first frame rate; and
generating based on the processing of the one or more medical images, one or more improved medical images.

2. The method of claim 1, wherein processing the one or more medical images comprises applying artificial intelligence (AI) based processing.

3. The method of claim 2, wherein applying the artificial intelligence (AI) based processing comprises applying deep learning based processing.

4. The method of claim 3, wherein applying the deep learning based processing comprises applying a deep learning based modeling.

5. The method of claim 4, wherein applying the deep learning based modeling comprises use of a generative adversarial network (GAN) based model.

6. The method of claim 4, wherein applying the deep learning based modeling comprises determining a distribution $P_\theta(x)$ that is an approximate to a real distribution $p_r(x)$ associated with the one or more medical images.

7. The method of claim 4, wherein applying a deep learning based modeling comprises generating a plurality of samples $p_G(x)$ that equals a probability density function of the real samples $p_r(x)$ associated with the one or more medical images.

8. A non-transitory computer readable medium having stored thereon a computer program having at least one code section, the at least one code section being executable by a machine comprising at least one processing circuit, for causing the machine to perform one or more steps comprising:
acquiring signals based on a medical imaging technique during medical imaging based examination of a patient, wherein the signals are acquired based on a first ensemble size and a first frame rate;
processing the acquired signals, wherein the processing comprises determining Doppler effects associated with at least some of the signals;
generating based on the processing of the acquired signals and the determining of the Doppler effects, one or more medical images, wherein the medical images are configured for color Doppler based examination, and wherein the one or more medical images comprise low quality color images;
processing the one or more medical images using at least one reference medical image corresponding to at least one of the one or more medical images, wherein the at least one reference medical image comprises high quality color image, wherein the high quality color image is generated based on signals acquired based on a second ensemble size and a second frame rate, and wherein the second ensemble size is higher than the first ensemble size and the second frame rate is lower than the first frame rate; and
generating based on the processing of the one or more medical images, one or more improved medical images.

9. The non-transitory computer readable medium of claim 8, wherein processing the one or more medical images comprises applying artificial intelligence (AI) based processing.

10. The non-transitory computer readable medium of claim 9, wherein applying the artificial intelligence (AI) based processing comprises applying deep learning based processing.

11. The non-transitory computer readable medium of claim 10, wherein applying the deep learning based processing comprises applying a deep learning based modeling.

12. The non-transitory computer readable medium of claim 11, wherein applying a deep learning based modeling comprises use of a generative adversarial network (GAN) based model.

13. The non-transitory computer readable medium of claim 11, wherein applying the deep learning based modeling comprises determining a distribution $p_\theta(x)$ that is an approximate to a real distribution $p_r(x)$ associated with the one or more medical images.

14. The non-transitory computer readable medium of claim 11, wherein applying the deep learning based modeling comprises generating a plurality of samples $P_G(x)$ that equal a probability density function of the real samples $p_r(x)$ associated with the one or more medical images.

15. A system comprising:
a scanner configured to acquire imaging signals based on a medical imaging technique during medical imaging based examination of a patient, wherein the signals are acquired based on a first ensemble size and a first frame rate; and
one or more circuits configured to:
process the acquired signals, wherein the processing comprises determining Doppler effects associated with at least some of the signals;
generate based on the processing of the acquired signals and the determining of the Doppler effects, one or more medical images, wherein the medical images are configured for color Doppler based examination, and wherein the one or more medical images comprise low quality color images;
process the one or more medical images using at least one reference medical image corresponding to at least one of the one or more medical images, wherein the at least one reference medical image comprises high quality color image, wherein the high quality color image is generated based on signals acquired based on a second ensemble size and a second frame rate, and wherein the second ensemble size is higher than the first ensemble size and the second frame rate is lower than the first frame rate; and
generate based on the processing of the one or more medical images, one or more improved medical images.

16. The system of claim 15, wherein the one or more circuits are further configured to, when processing the one or more medical images, apply artificial intelligence (AI) based processing.

17. The system of claim 16, wherein the one or more circuits are further configured to, when applying the artificial intelligence (AI) based processing, apply deep learning based processing.

18. The system of claim 17, wherein the one or more circuits are further configured to, when applying the deep learning based processing, apply a deep learning based modeling.

19. The system of claim 18, wherein the one or more circuits are further configured to apply the deep learning based modeling using a generative adversarial network (GAN) based model.

20. The system of claim 18, wherein the one or more circuits are further configured to, when applying the deep learning based processing, determine a distribution $p_\theta(x)$ that is an approximate to a real distribution $p_r(x)$ associated with the one or more medical images.

21. The system of claim 18, wherein the one or more circuits are further configured to, when applying the deep learning based processing, generate a plurality of samples $p_G(x)$ that equals a probability density function of the real samples $p_r(x)$ associated with the one or more medical images.

* * * * *